US008959436B2

(12) United States Patent
Duhig

(10) Patent No.: US 8,959,436 B2
(45) Date of Patent: Feb. 17, 2015

(54) METHOD OF SELECTING A FRAME FROM MOTION VIDEO

(75) Inventor: Jonathan Anthony Duhig, Scotland Island (AU)

(73) Assignee: Canon Kabushiki Kaisha, Tokyo (JP)

(*) Notice: Subject to any disclaimer, the term of this patent is extended or adjusted under 35 U.S.C. 154(b) by 871 days.

(21) Appl. No.: 12/631,315

(22) Filed: Dec. 4, 2009

(65) Prior Publication Data

US 2010/0146392 A1 Jun. 10, 2010

(30) Foreign Application Priority Data

Dec. 10, 2008 (AU) .................................. 2008255228

(51) Int. Cl.
*G06F 3/00* (2006.01)
*H04N 5/76* (2006.01)
*G11B 27/034* (2006.01)
*G11B 27/34* (2006.01)
*H04N 1/00* (2006.01)

(52) U.S. Cl.
CPC ................ *H04N 5/76* (2013.01); *G11B 27/034* (2013.01); *G11B 27/34* (2013.01); *H04N 1/00448* (2013.01); *H04N 1/00461* (2013.01)
USPC ........... 715/719; 715/720; 715/723; 715/730; 715/739; 715/810

(58) Field of Classification Search
CPC .............. G06F 3/048; G06F 17/10852; G06T 2207/10016; G06T 2200/24
See application file for complete search history.

(56) References Cited

U.S. PATENT DOCUMENTS

| 6,211,869 | B1 * | 4/2001 | Loveman et al. ............. 715/723 |
| RE38,401 | E * | 1/2004 | Goldberg et al. ............. 715/720 |
| 7,660,416 | B1 * | 2/2010 | Kline ............................ 380/216 |
| 8,196,043 | B2 * | 6/2012 | Crow et al. ................... 715/716 |
| 2002/0186405 | A1 | 12/2002 | Gragg et al. |
| 2003/0184658 | A1 | 10/2003 | Fredlund et al. |
| 2006/0029364 | A1 | 2/2006 | Kosugi |
| 2006/0221184 | A1 * | 10/2006 | Vallone et al. ................ 348/155 |
| 2008/0034306 | A1 | 2/2008 | Ording |
| 2008/0086688 | A1 | 4/2008 | Chandratillake et al. |

FOREIGN PATENT DOCUMENTS

EP 1830361 A1 9/2007

OTHER PUBLICATIONS

Australian Notice of Acceptance dated Oct. 7, 2011 in corresponding Australian Application No. 2008255228.
Australian Examiner's Report dated Sep. 8, 2010 in corresponding Australian Patent Application No. 2008255228.

* cited by examiner

*Primary Examiner* — Anil N Kumar
(74) *Attorney, Agent, or Firm* — Fitzpatrick, Cella, Harper & Scinto

(57) ABSTRACT

A method of selecting a frame (e.g., 301-306) from a motion video file is disclosed. A first representation of the motion video file is displayed in a list. The first representation is responsive to one or more playback commands. The frame of the motion video file is selected in response to a command received in relation to the first representation. A second representation of the motion video file is displayed in the list in response to the selection. The second representation displays the selected frame.

14 Claims, 12 Drawing Sheets

METHOD OF SELECTING A FRAME FROM MOTION VIDEO

CROSS-REFERENCE TO RELATED PATENT APPLICATIONS

This application claims the right of priority under 35 U.S.C. §119 based on Australian Patent Application No. 2008255228, filed 10 Dec. 2008, which is incorporated by reference herein in its entirety as if fully set forth herein.

FIELD OF INVENTION

The current invention relates to motion video and, in particular, to a method and apparatus for selecting frames from a motion video. The current invention also relates to a computer program product including a computer readable medium having recorded thereon a computer program for selecting frames from a motion video.

DESCRIPTION OF BACKGROUND ART

With the advent of digital photography it is now common for people to produce digital images and digital video with small hand-held cameras, with camera systems attached to or built into computers and with camera systems built into mobile phones. There are also many millions of images and videos available for free download and for purchased download via the internet. These produced and downloaded images and videos are stored as digital files on storage media such as compact flash cards and on portable media such as optical disks and portable USB drives using solid-state flash memory. The produced and downloaded images and videos are also stored on portable disk drives and on computer disk drives. Digital files can be copied to new storage devices easily and transferred to different devices using portable or removable media and can also be sent electronically via electronic networks using computers, portable digital assistants and mobile phones. Devices which can decode the digital files can output the images and video on a display screen or can print images and video frames on paper or other print media. There are many options, devices and technologies available for capturing, storing, moving, viewing and outputting digital pictures and video.

With relatively cheap digital cameras available there has been an explosive growth in the amount of digital images and videos produced and shared by amateurs. This means that people often have large sets of images and videos and there is a need for people to be able to easily view and select items from sets of multiple items. One problem with conventional technologies for file viewing technology is that motion video files are displayed as single items, usually as a filename and/or a thumbnail image in a list of items. As such, a particular image from a certain time, perhaps in the middle of the video, is not accessible as a selectable item. Further, displaying the motion video file as a single item in a list means that time dimension is not represented.

However, for some tasks a user may need to select one or more static frames from within a series of frames forming a video sequence. A user who wishes to select a set of certain frames from within a motion video file for a purpose (e.g., to make a printed photograph), has to extract the frames using more complicated technologies and methods. Usually the user must play the video to access the time dimension of the motion video file, in order to select a frame.

One known method of extracting frames from motion video involves playing a motion video file in a software program and issuing an instruction to create a still image from a chosen frame. In this instance, a new still image file (e.g., a JPEG image file) is created and can be saved to a storage medium. While this may be acceptably difficult on a complex device like a home computer, the problem becomes more difficult on devices with more simple input and output devices, such as mobile telephones, personal data assistants (PDAs) and the like. The task of selecting the correct frame involves careful playback control by the operator which may interrupt the normal video viewing process because the operator has to slow the playback speed to select the exact frame. The still image produced by the instruction to create a new image file cannot be adjusted if the user has erroneously selected a frame just before or just after the ideal still image.

Thus, a need clearly exists for a more efficient and easier method of selecting frames from a motion video.

SUMMARY OF THE INVENTION

It is an object of the present invention to substantially overcome, or at least ameliorate, one or more disadvantages of existing arrangements.

According to one aspect of the present invention there is provided a method of selecting a frame from a motion video file, said method comprising the steps of:

displaying a first representation of the motion video file in a list, the first representation being responsive to one or more playback commands;

selecting the frame of the motion video file, in response to a command received in relation to the first representation; and displaying a second representation of the motion video file in the list in response to the selection, wherein the second representation displays the selected frame.

According to another aspect of the present invention there is provided an apparatus for selecting a frame from a motion video file, said apparatus comprising:

display means for displaying a first representation of the motion video file in a list, the first representation being responsive to one or more playback commands; and selection means for selecting the frame of the motion video file, in response to a command received in relation to the first representation, wherein a second representation of the motion video file in the list is displayed in response to the selection, the second representation displaying the selected frame.

According to still another aspect of the present invention there is provided a system for selecting a frame from a motion video file, said system comprising:

a memory for storing data and a computer program;

a processor coupled to said memory for executing said program, said program comprising instructions for:

displaying a first representation of the motion video file in a list, the first representation being responsive to one or more playback commands;

selecting the frame of the motion video file, in response to a command received in relation to the first representation; and displaying a second representation of the motion video file in the list in response to the selection, wherein the second representation displays the selected frame.

According to still another aspect of the present invention there is provided a computer readable medium having recorded thereon a computer program for selecting a frame from a motion video file, said program comprising:

code for displaying a first representation of the motion video file in a list, the first representation being responsive to one or more playback commands;

code for selecting the frame of the motion video file, in response to a command received in relation to the first representation; and code for displaying a second representation of the motion video file in the list in response to the selection, wherein the second representation displays the selected frame.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1:
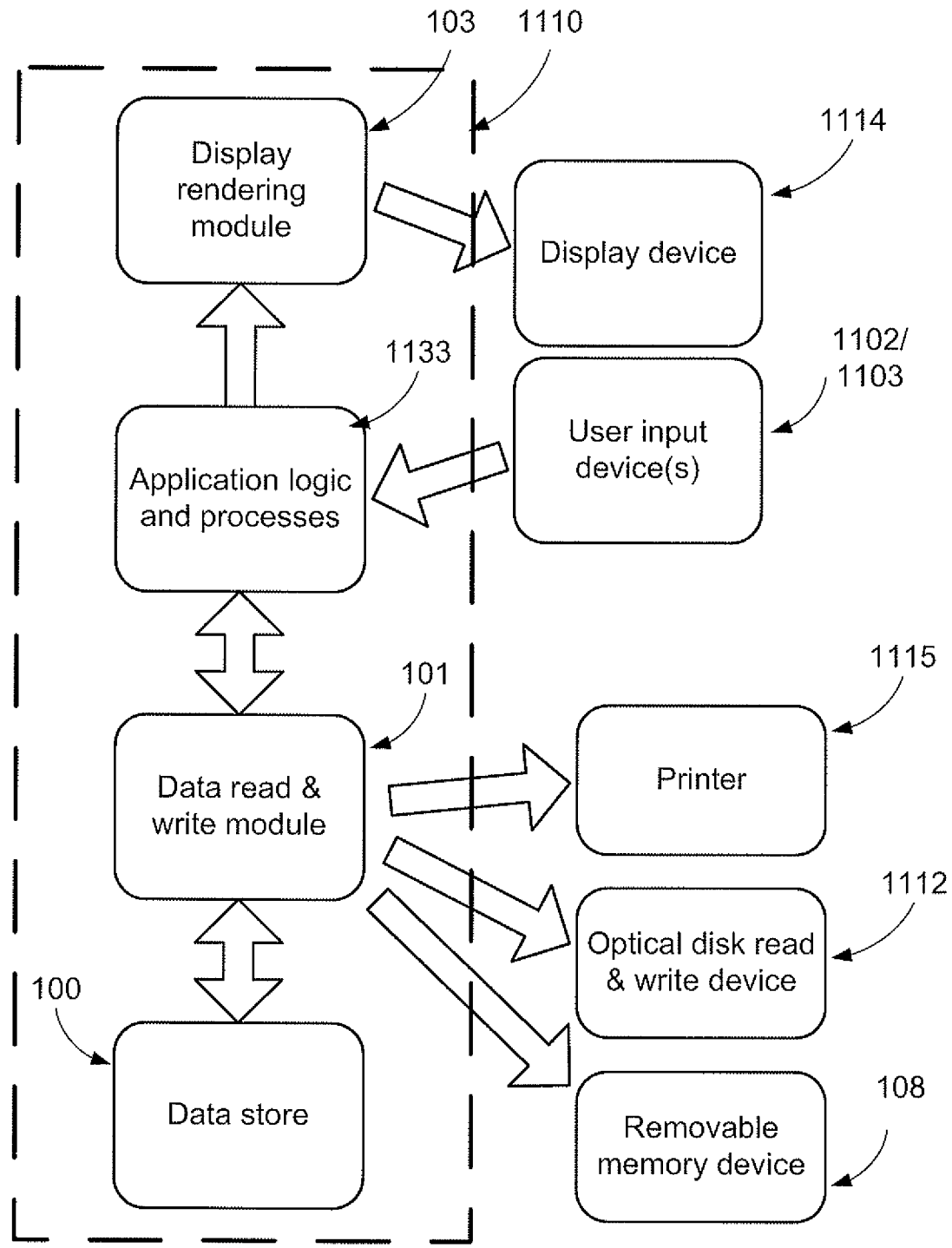
FIG. 1 shows how software modules interact with hardware devices of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

A method 800 (see FIG. 8) of selecting one or more frames from a motion video file will be described below with reference to FIGS. 1 to 11B.

Figure 11A:
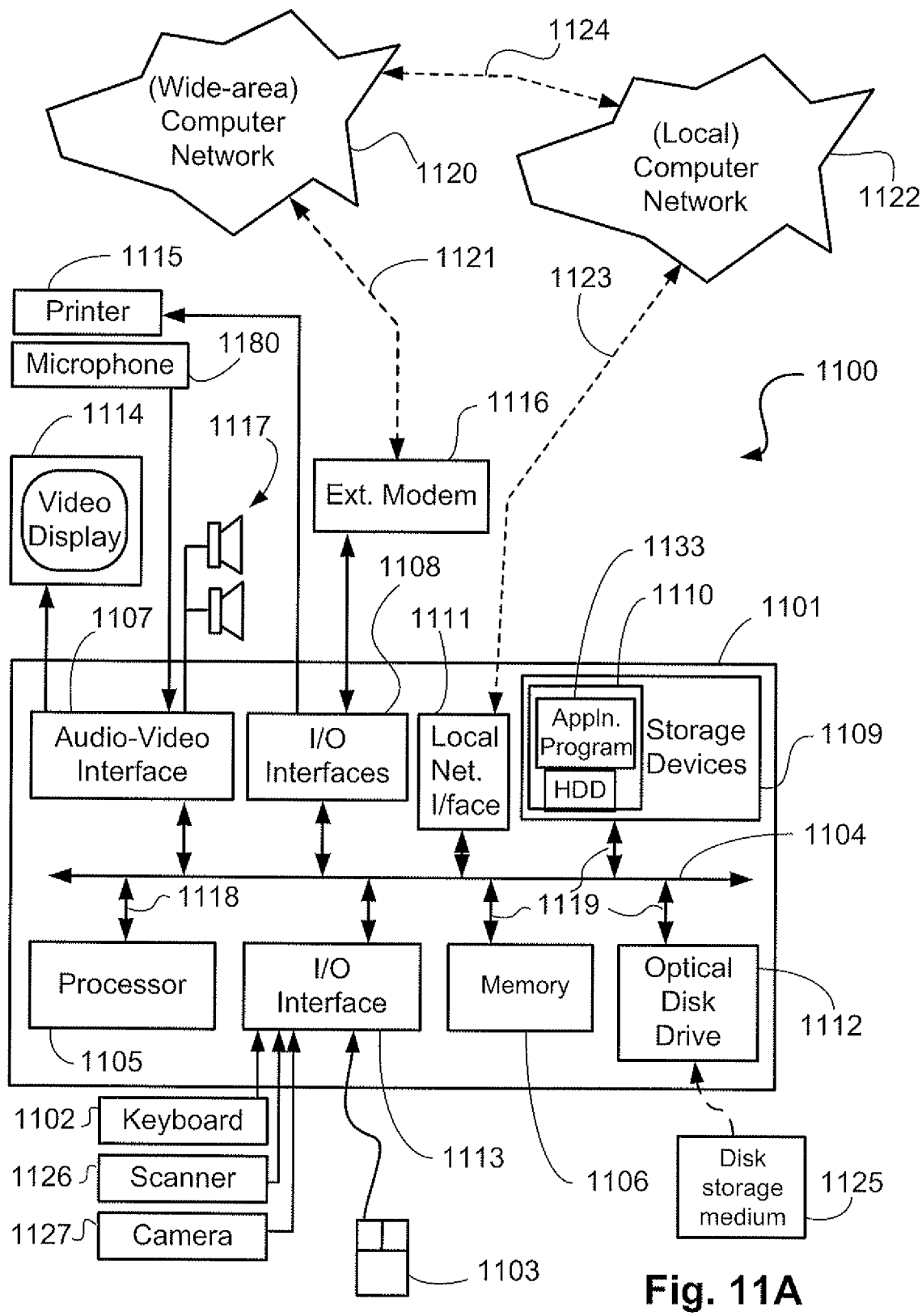
FIGS. 11A and 11B form a schematic block diagram of a general purpose computer system upon which arrangements described can be practiced.
Figure 11B:
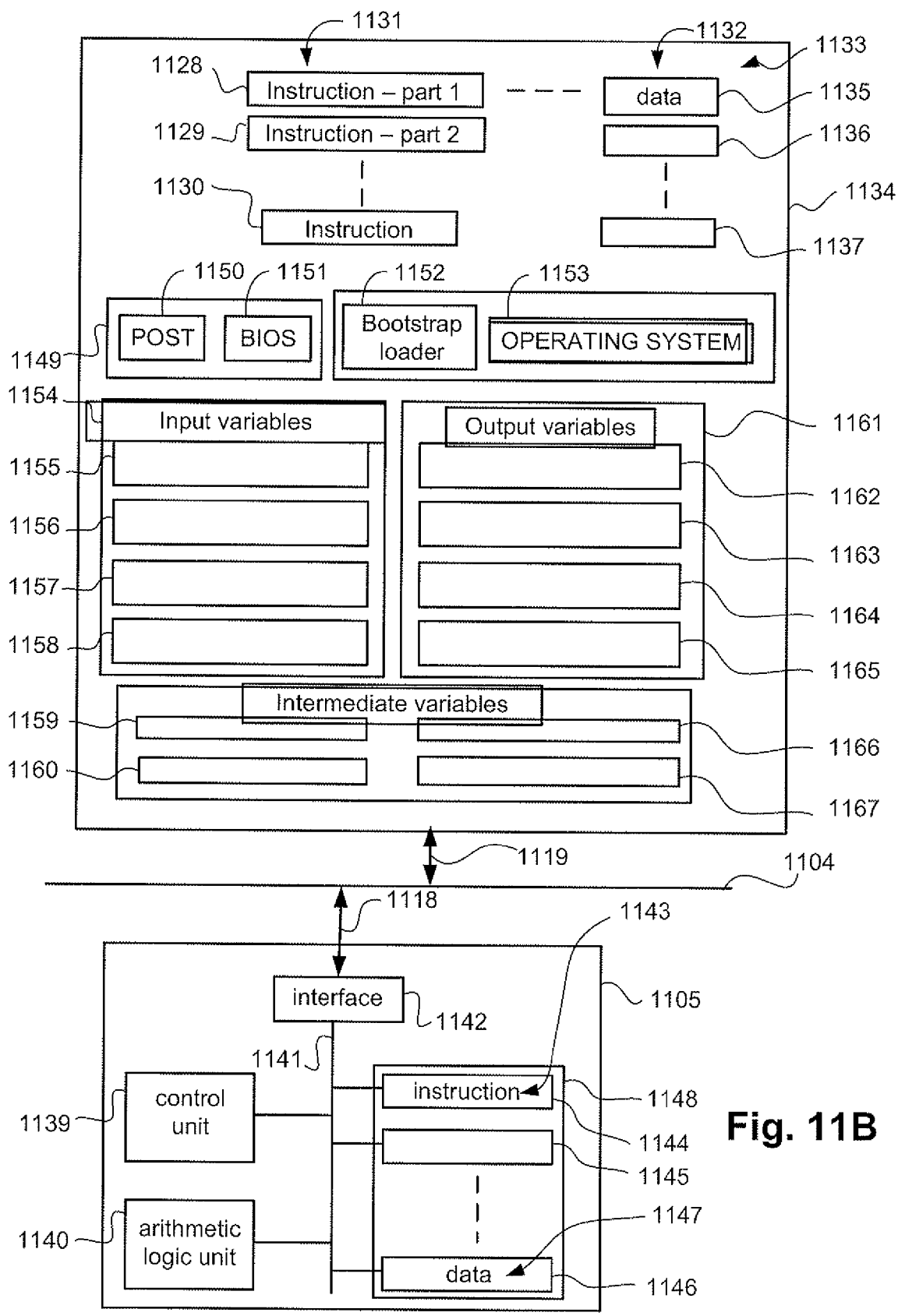

FIGS. 11A and 11B collectively form a schematic block diagram of a general purpose computer system 1100, upon which the various arrangements described can be practiced.

As seen in FIG. 11A, the computer system 1100 is formed by a computer module 1101, input devices such as a keyboard 1102, a mouse pointer device 1103, a scanner 1126, a camera 1127, and a microphone 1180, and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The network 1120 may be a wide-area network (WAN), such as the Internet or a private WAN. Where the connection 1121 is a telephone line, the modem 1116 may be a traditional "dial-up" modem. Alternatively, where the connection 1121 is a high capacity (eg: cable) connection, the modem 1116 may be a broadband modem. A wireless modem may also be used for wireless connection to the network 1120. The computer module 1101 typically includes at least one processor unit 1105, and a memory unit 1106 for example formed from semiconductor random access memory (RAM) and semiconductor read only memory (ROM). The module 1101 also includes a number of input/output (I/O) interfaces including an audio-video interface 1107 that couples to the video display 1114, loudspeakers 1117 and microphone 1180, an I/O interface 1113 for the keyboard 1102, mouse 1103, scanner 1126, camera 1127 and optionally a joystick (not illustrated), and an interface 1108 for the external modem 1116 and printer 1115. In some implementations, the modem 1116 may be incorporated within the computer module 1101, for example within the interface 1108. The computer module 1101 also has a local network interface 1111 which, via a connection 1123, permits coupling of the computer system 1100 to a local computer network 1122, known as a Local Area Network (LAN). As also illustrated, the local network 1122 may also couple to the wide network 1120 via a connection 1124, which would typically include a so-called "firewall" device or device of similar functionality. The interface 1111 may be formed by an Ethernet™ circuit card, a Bluetooth™ wireless arrangement or an IEEE 802.11 wireless arrangement. The interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (eg: CD-ROM, DVD), USB-RAM, and floppy disks for example may then be used as appropriate sources of data to the system 1100.

The components 1105 to 1113 of the computer module 1101 typically communicate via an interconnected bus 1104 and in a manner which results in a conventional mode of operation of the computer system 1100 known to those in the relevant art. Examples of computers on which the described arrangements can be practised include IBM-PC's and compatibles Sun Sparcstations Apple Mac™ or alike computer systems evolved therefrom.

The described arrangements may be implemented using the computer system 1100 wherein the processes of FIGS. 1 to 10B, to be described, may be implemented as one or more software application programs 1133 executable within the computer system 1100. In particular, the steps of methods described below are effected by instructions 1131 in the software that are carried out within the computer system 1100. The software instructions 1131 may be formed as one or more code modules, each for performing one or more particular tasks. The software may also be divided into two separate parts, in which a first part and the corresponding code modules performs the described methods and a second part and the corresponding code modules manage a user interface between the first part and the user. The software may be stored in a computer readable medium, including the storage devices described below, for example. The software is loaded into the computer system 1100 from the computer readable medium, and is then executed by the computer system 1100. A computer readable medium having such software or computer program recorded on it is a computer program product. The use of the computer program product in the computer system 1100 preferably effects an advantageous apparatus for implementing the described methods.

The software 1133 is typically stored in the HDD 1110 or the memory 1106. The software is loaded into the computer system 1100 from a computer readable medium, and is then executed by the computer system 1100. Thus for example the software may be stored on an optically readable CD-ROM medium 1125 that is read by the optical disk drive 1112. A computer readable medium having such software or computer program recorded on it is a computer program product. The use of the computer program product in the computer system 1100 preferably effects an advantageous apparatus for implementing the described methods.

In some instances, the application programs 1133 may be supplied to the user encoded on one or more CD-ROM 1125 and read via the corresponding drive 1112, or alternatively may be read by the user from the networks 1120 or 1122. Still further, the software can also be loaded into the computer system 1100 from other computer readable media. Computer readable storage media refers to any storage medium that participates in providing instructions and/or data to the computer system 1100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 1101. Examples of computer readable transmission media that may also participate in the provision of software, application programs, instructions and/or data to the computer module 1101 include radio or infra-red transmission channels as well as a network connection to another computer or networked device, and the Internet or Intranets including e-mail transmissions and information recorded on Websites and the like. The second part of the application programs 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11B is a detailed schematic block diagram of the processor 1105 and a "memory" 1134. The memory 1134 represents a logical aggregation of all the memory modules (including the HDD 1109 and semiconductor memory 1106) that can be accessed by the computer module 1101 in FIG. 11A.

When the computer module 1101 is initially powered up, a power-on self-test (POST) program 1150 executes. The POST program 1150 is typically stored in a ROM 1149 of the semiconductor memory 1106. A hardware device such as the ROM 1149 is sometimes referred to as firmware. The POST program 1150 examines hardware within the computer module 1101 to ensure proper functioning, and typically checks the processor 1105, the memory (1109, 1106), and a basic input-output systems software (BIOS) module 1151, also typically stored in the ROM 1149, for correct operation. Once the POST program 1150 has run successfully, the BIOS 1151 activates the hard disk drive 1110. Activation of the hard disk drive 1110 causes a bootstrap loader program 1152 that is resident on the hard disk drive 1110 to execute via the processor 1105. This loads an operating system 1153 into the RAM memory 1106 upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory (1109, 1106) in order to ensure that each process or application running on the computer module 1101 has sufficient memory in which to execute without colliding with memory allocated to another process. Furthermore, the different types of memory available in the system 1100 must be used properly so that each process can run effectively. Accordingly, the aggregated memory 1134 is not intended to illustrate how particular segments of memory are allocated (unless otherwise stated), but rather to provide a general view of the memory accessible by the computer system 1100 and how such is used.

The processor 1105 includes a number of functional modules including a control unit 1139, an arithmetic logic unit (ALU) 1140, and a local or internal memory 1148, sometimes called a cache memory. The cache memory 1148 typically includes a number of storage registers 1144-1146 in a register section. One or more internal busses 1141 functionally interconnect these functional modules. The processor 1105 typically also has one or more interfaces 1142 for communicating with external devices via the system bus 1104, using a connection 1118.

The application program 1133 includes a sequence of instructions 1131 that may include conditional branch and loop instructions. The program 1133 may also include data 1132 which is used in execution of the program 1133. The instructions 1131 and the data 1132 are stored in memory locations 1128-1130 and 1135-1037 respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128-1129.

In general, the processor 1105 is given a set of instructions which are executed therein. The processor 1105 then waits for a subsequent input, to which it reacts to by executing another set of instructions. Each input may be provided from one or more of a number of sources, including data generated by one or more of the input devices 1102, 1103, data received from an external source across one of the networks 1120, 1102, data retrieved from one of the storage devices 1106, 1109 or data retrieved from a storage medium 1125 inserted into the corresponding reader 1112. The execution of a set of the instructions may in some cases result in output of data. Execution may also involve storing data or variables to the memory 1134.

The described methods use input variables 1154 that are stored in the memory 1134 in corresponding memory locations 1155-1158. The described methods produce output variables 1161 that are stored in the memory 1134 in corresponding memory locations 1162-1165. Intermediate variables may be stored in memory locations 1159, 1160, 1166 and 1167.

The register section 1144-1146, the arithmetic logic unit (ALU) 1140, and the control unit 1139 of the processor 1105 work together to perform sequences of micro-operations needed to perform "fetch, decode, and execute" cycles for every instruction in the instruction set making up the program 1133. Each fetch, decode, and execute cycle comprises:

(a) a fetch operation, which fetches or reads an instruction 1131 from a memory location 1128;
(b) a decode operation in which the control unit 1139 determines which instruction has been fetched; and
(c) an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 1 to 10B is associated with one or more segments of the program 1133, and is performed by the register section 1144-1047, the ALU 1140, and the control unit 1139 in the processor 1105 working together to perform the fetch, decode, and execute cycles for every instruction in the instruction set for the noted segments of the program 1133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

The processor 1105 may access a data store 100 seen in FIG. 1. The data store 100 may be configured within the hard disk drive 1110 seen in FIG. 1. The data store 100 contains multimedia items (or items), such as image and video files, which can be read and modified and created by the software application 1133 using a data read/write software module 101. The application 1133 can use a display rendering module 103 to transform the digital content contained in a video file, for example, from the data store 100 into a graphical representation displayed on the display device 1114. A user can control the application 1133 by providing input using one or more user input devices, such as the keyboard 1102 and mouse pointer device 1103. In such a way a user is able to interact visually with data stored within the data store 100 of the hard disk drive 1110 as digital information. The application 133 may be configured to output the data files onto media such as the printer 1115, an optical disk as described above in the optical disk drive 1112 or the portable memory devices such as a USB-RAM 108. Accordingly, users are able to select parts of a set of stored videos for output or transfer.

Figure 9A:
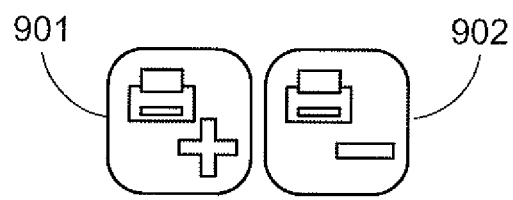
FIG. 9A shows exemplary controls which allow a user to increase and decrease the amount of copies of an item to be printed.

FIG. 9A shows exemplary controls 901 and 902 which allow a user to increase and decrease a number of copies of an image frame displayed within a multimedia item 403 (see FIG. 4) to be printed, through manipulation of the keyboard 1102 and/or mouse 1103. The controls 901 and 902 may be implemented as hardware devices or as software resident on the hard disk drive 1110 and being rendered by the processor 1105 on the display 1114. The control 901 either included as a hardware device or rendered as a selectable control on the display device 1114 may be selected by a user to add the item to a print list configured within the memory 1106 and, subsequently, the processor 1105 increases the amount of copies. The control 902 may be similarly provided to allow the user to decrease the number of copies that will be printed.

Figure 9B:
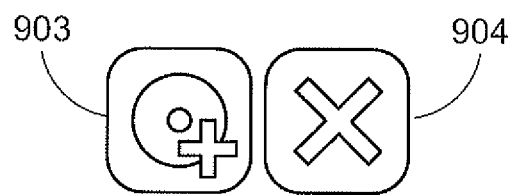
FIG. 9B shows exemplary controls which can allow a user to add and remove an item to a selection list for inclusion onto a removable optical disk.

FIG. 9B shows exemplary controls 903 and 904 which can allow a user to add and remove an item to a selection list configured within memory 1106 for inclusion onto a removable optical disk such as a CD-ROM or a DVD. Again, the controls 903 and 904 may be implemented as hardware devices or as software resident on the hard disk drive 1110 and being rendered by the processor 1105 on the display 1114. Similar controls may be used to add items to a selection list to be added to a flash memory card. Such portable memory devices are commonly used to transfer items to retail outlets for printing.

Figure 9C:
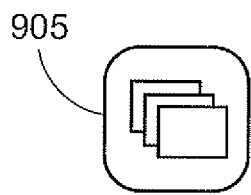
FIG. 9C shows exemplary controls which can be used to add the item to a selection list which is used to create a visual presentation such as a slideshow.

FIG. 9C shows an exemplary control 905, which can also be implemented as a hardware device or as software resident in the hard disk drive 1110 and being rendered by the processor 1105 on the display device 1114. The control 905 may be used to add the item to a selection list, which is used to create a visual presentation such as a slideshow. Such a slideshow can be shown as an ambient background on a TV screen or in a digital picture frame. The same control 905 in a different context may be used to create a selection list for a custom playlist which may be used as a form of entertainment. Many other forms of output for still images produced from video sequences are possible and require a selection list.

Figure 3:
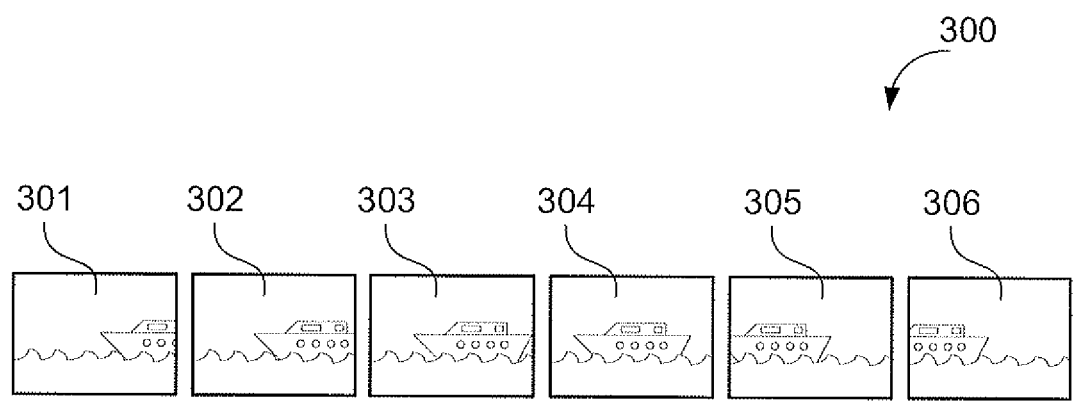
FIG. 3 shows exemplary still image frames within a single exemplary motion video file.

FIG. 3 shows graphical representations of frames 301-306 from within a motion video file. In the example of FIG. 3, a motion video file contains a series 300 of encoded static image frames 301-306 that can be rendered sequentially on the display device 1114 by the processor 1105 to produce the visual effect of a moving image. As seen in FIG. 3, an object representing a boat can be seen to move from one side of a viewing area as seen in frame 301 through the viewing area to the other side of the viewing area as in frame 306. Sequentially rendering the frames 301-306 on the display device 1114 is known as 'playback'. The motion video file comprising the frames 301-306 is stored in the data store 100 within the hard disk drive 1110.

Figure 2A:
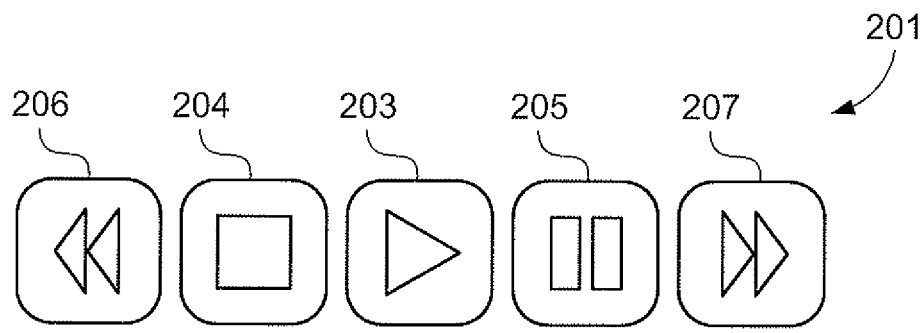
FIG. 2A shows an exemplary set of motion video playback controls.
Figure 2B:
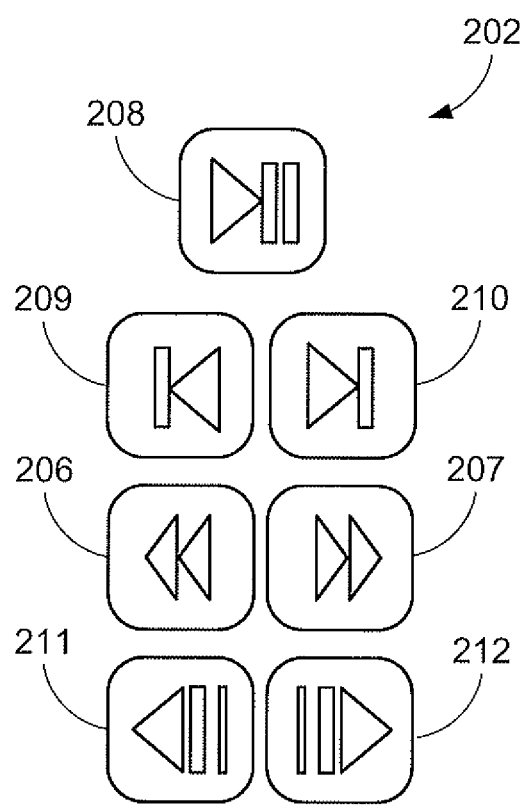
FIG. 2B shows another exemplary set of motion video playback controls.

FIGS. 2A and 2B show examples of controls 201 and 202 which can be used to control the playback of a series of frames of a motion video file, such as the series 300. The controls may be implemented as hardware. Alternatively, the sets of controls 201 and 202 may be implemented as software resident within the hard disk drive 1110 and being rendered by the processor 1105 on the display 1114. Each of the controls (e.g., 206) represents one or more playback commands (e.g., rewind).

FIG. 2A shows a set of controls 201 comprising a Play command control 203, a Stop command control 204, a Pause command control 205, a Rewind command control 206 and a Fast Forward command control 207. Upon selection of one of the controls 203 to 207, rendered on the display 1114, using the pointer device 1103, for example, the processor 1105 executes a command to perform the corresponding function on the series 300 of frames. For example, selection of the Play command control 203 may result in the processor 1105 executing a command so that the series 300 of frames 301-306 is rendered sequentially on the display device 1114.

FIG. 2B shows a more advanced control set 202 comprising a Play/Pause command control 208 selection of which causes the processor 1105 to toggle between playing and paused playback modes. The set 202 also comprises a First Frame command control 209 selection of which causes the processor 1105 to move the playback to the first frame (e.g., 301) of the video and a Last Frame command control 210 selection of which causes the processor 1105 to move the playback to the last frame (e.g., 306) of the video. The set 202 also comprises a Rewind command control 206 and a Fast Forward command control 207, selection of which causes the processor 1105 to rewind or fast forward the series 300, respectively. The set 202 also comprises a Slow/Step Reverse command control 211 (or a "Jog Back command") selection of which moves the video series 300 backwards by a single frame and a Slow/Step Forward command control 212 (or a "Jog Forward command") selection of which moves the video series 300 forwards by a single frame. Many other configurations of these and similar functions are possible. The term, 'playback commands', herein includes all commands which modify the updating of video frames (e.g., 301-306) on a display such as the display device 1114.

Figure 4A:
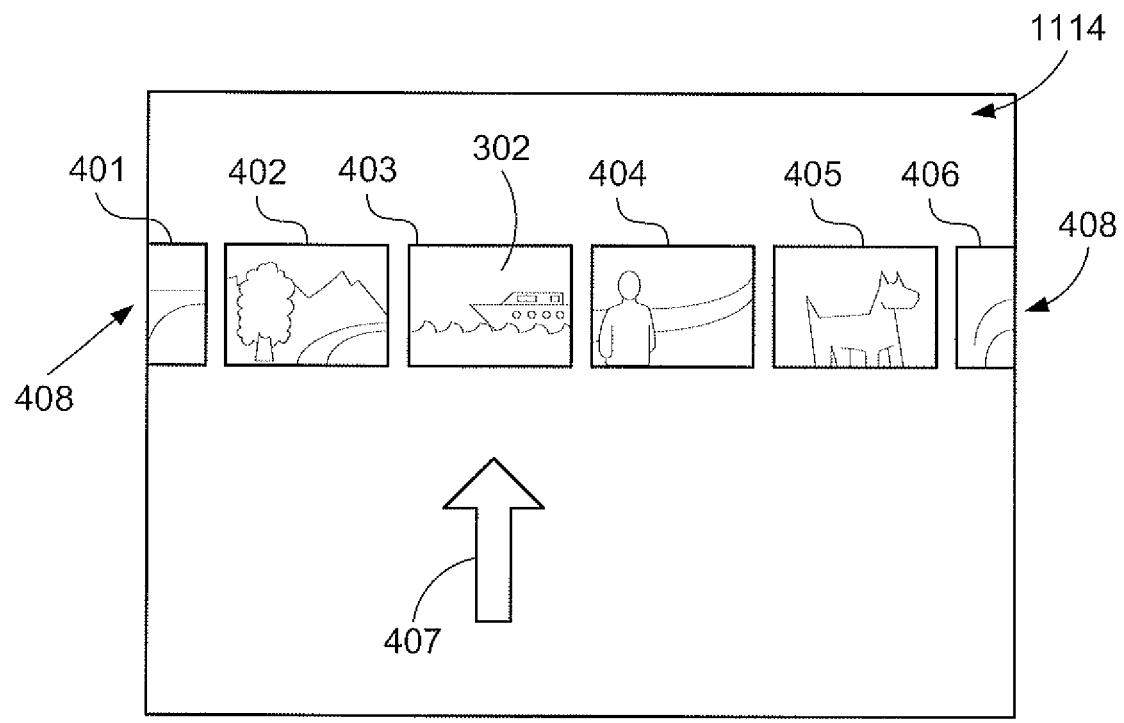
FIG. 4A shows an example list of multimedia items.

FIG. 4A shows the display device 1114 on which an example list 408 of representations of multimedia items 401-406 are partially or fully rendered by the processor 1105. Each of the multimedia items 401-406 of the list 408 may be stored within the data store 100 in the hard disk drive 1110. Some form of indication, such as an arrow indication 407, is provided to indicate that one item 403 is selected and is the subject of certain user input commands. For example, the indication 407 may indicate that the item 403 is currently subject to playback commands or commands in relation to a selection list configured within memory 1106. In the example of FIG. 4A, a video frame 302 from the series 300 of frames 301-306 in rendered within the item 403. The video frame 302 has been decoded and rendered by the processor 1105 onto the display device 1114 within the item 403.

Figure 4B:
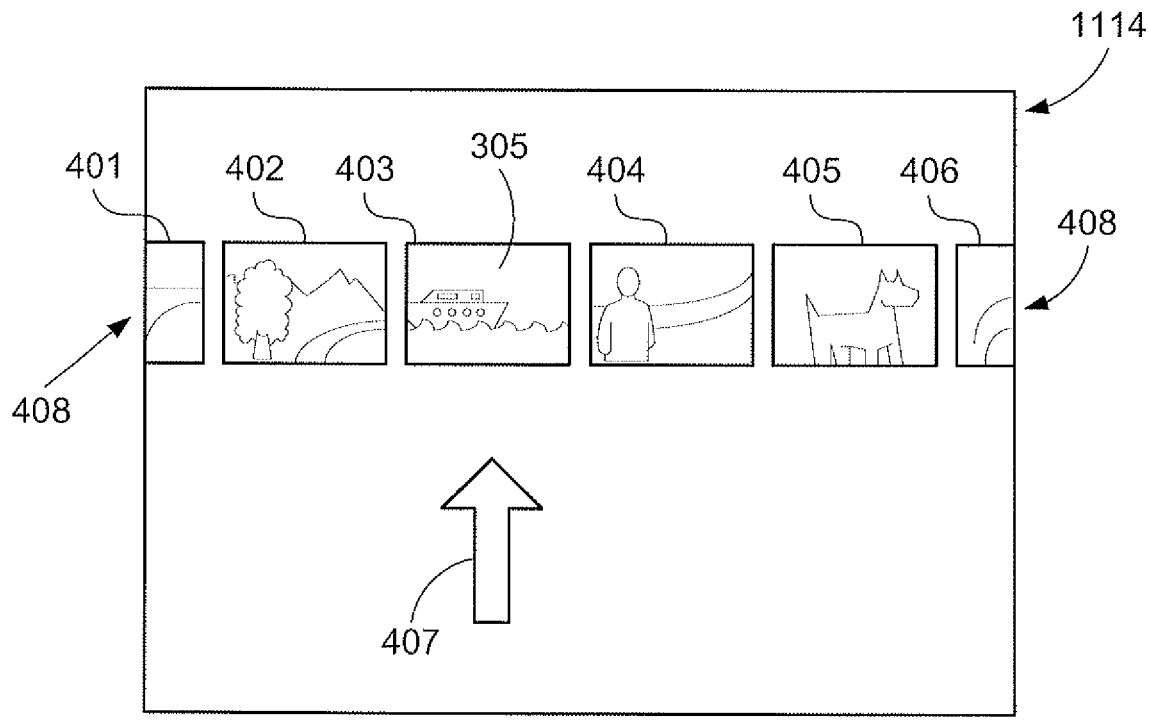
FIG. 4B shows the list of FIG. 4A, with a different frame rendered within one of the items of the list.

At a later time, as shown in FIG. 4B, a different frame 305 is now accessed from the data store 100 and rendered by the processor 1105 into the item 403. Hence, in the example of FIGS. 4A and 4B, a visual representation of the digital video file, comprising the series 300 of frames 301-306, is a series of images rendered by the processor 1105 in accordance with current video playback settings for the item 403. The current video playback settings for the item 403 may be stored, for example, as a data file together with the item 403 in the data store 100. The representation of the digital video file comprising the series 300 is a moving video image representing the frames 301-306 rendered within the item 403.

Figure 5A:
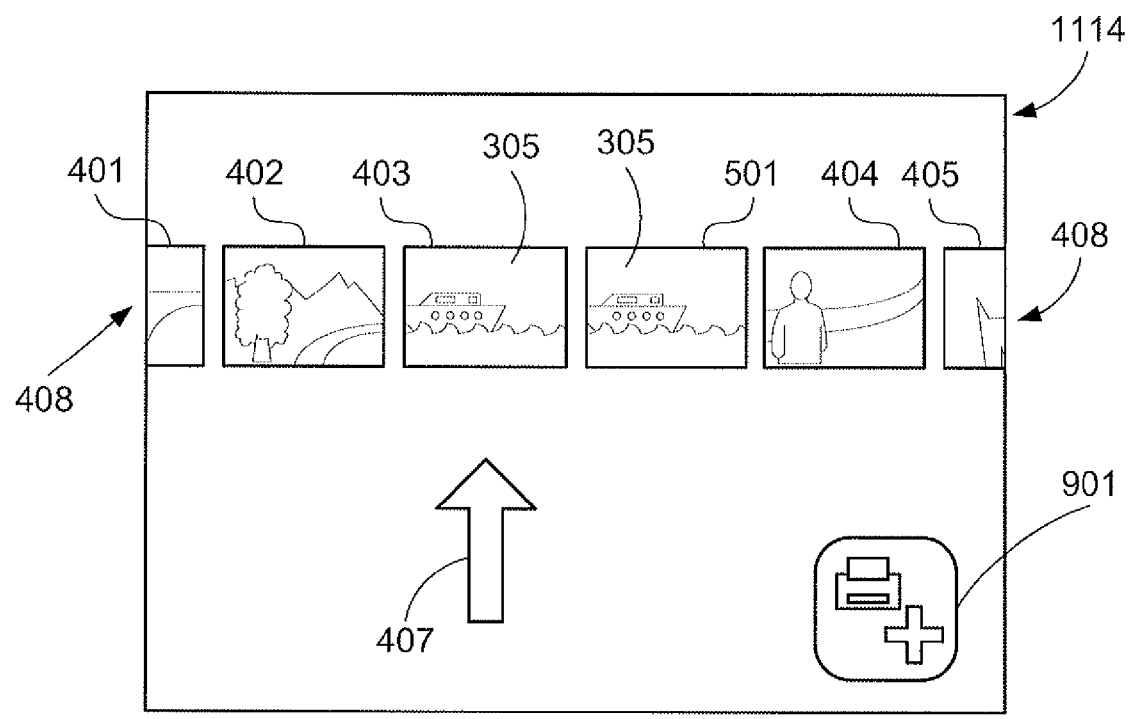
FIG. 5A shows the list of FIG. 4A with a new item displayed in the list.

FIG. 5A shows the display device 1114 on which the list 408 is rendered by the processor 1105. In the example of FIG. 5A, the displayed item 403 has been selected by a user controlling the selection indicator 407. In the example, the selected item 403 is currently displaying the series 300 at normal video playback settings, under execution of the processor 1105. In the example of FIG. 5A, in response to a user selecting a control, such as the print control 901 displayed on the display 114, a currently displayed frame 305 (i.e., the frame 305 being displayed in the selected item 403 at a time when the print control 901 is selected) is selected and a new item 501 representing the video file comprising the series 300 has been rendered by the processor 1105 onto the display device 1114 adjacent to the original displayed item 403. In rendering the item 501 the processor 1105 adjusts the position of previously adjacent items 404-406 in order to accommodate the new item 501 into the list 408. The new item 501 displays the same frame 305 selected by the user when the user activated the print command with the print control 901 whilst the selected item 403 was displaying that frame 305.

Figure 5B:
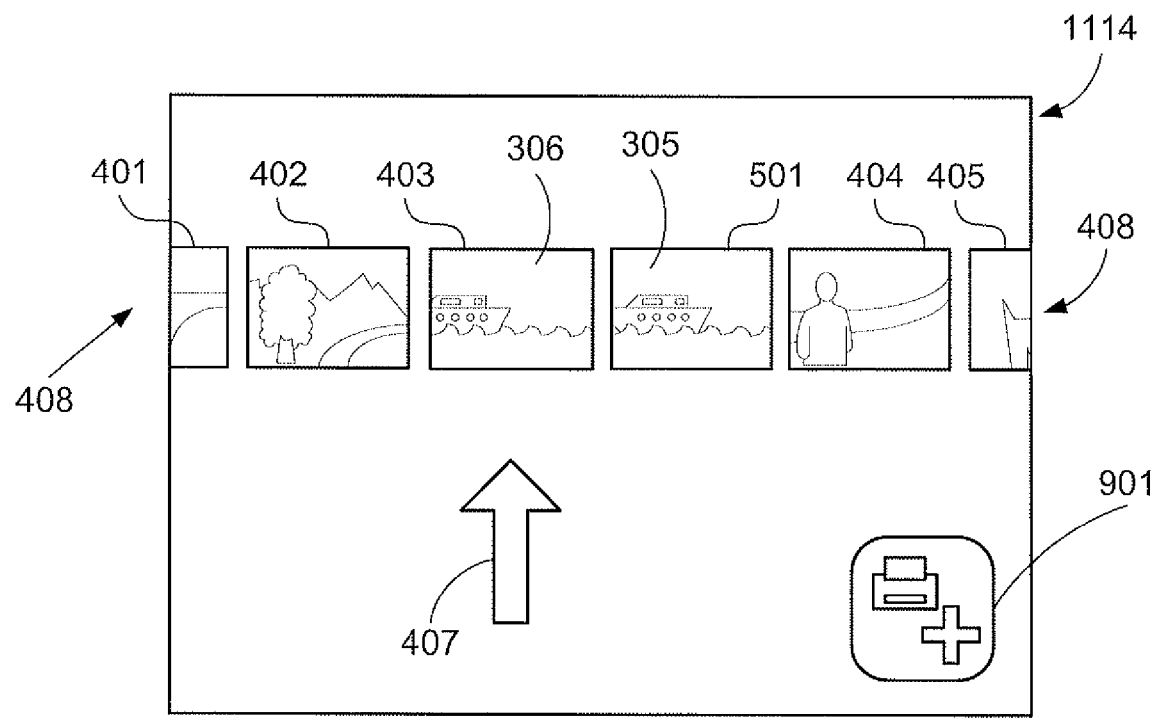
FIG. 5B shows the list of FIG. 5A with the playback of frames within the new item stopped.

As shown in FIG. 5B, the playback of the frames 301-306 within the selected item 403 continues such that subsequent frames (e.g., frame 306) are rendered within the item 403 according to the present playback settings of the selected item 403. The playback of the frames 301-306 within the item 501 is stopped when the item 501 is initially displayed. For example, as shown in FIG. 5B, the playback of the frames 301-306 within the item 501 is stopped such that the selected frame 305 is displayed within the item 501 indicating which frame (i.e., frame 501) has been selected. The rendering of the item 501 by the processor 1105 provides the user a clear indication of number of different frames that have been selected from the motion video file comprising the frames 301-306 because any selected frames are evident in the list 408.

Figure 6A:
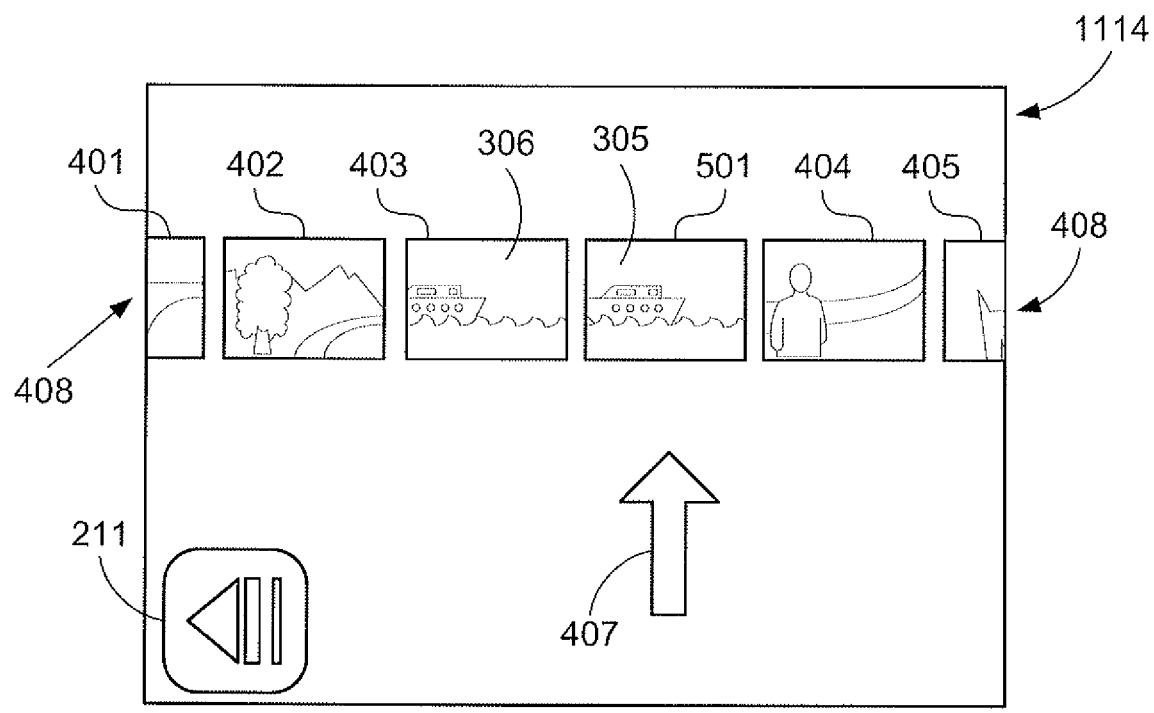
FIG. 6A shows the list of FIG. 5B with a Slow/Step controls rendered adjacent to the list.
Figure 6B:
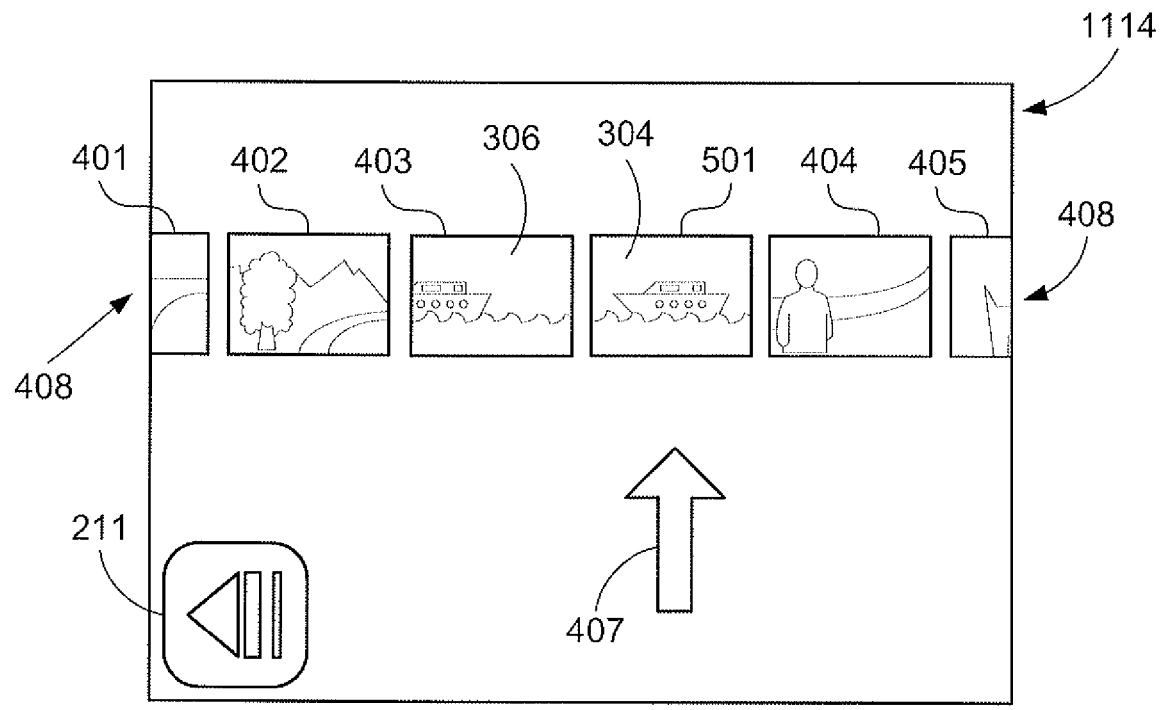
FIG. 6B shows the list of FIG. 6A, where the frame within the new item has been replaced.

FIG. 6A again shows the display device 1114 on which the list 408, including the new item 501, is rendered by the processor 1105. In the example of FIG. 6A, a user has controlled the selection indicator 407, using the mouse pointer device 1103, for example, to select the new item 501. The user may also operate the playback controls 201 or 202 to display a new frame within the item 501. For example, a Slow/Step backwards control 211 rendered on display 1114 may be selected. In response to selection of the control 211, as shown in FIG. 6B, the processor 1105 replaces the frame 305 displayed within the new item 501 with an earlier frame 304 which the user may prefer for selection. The earlier frame 304 may be retrieved by the processor 1105 from the data store 100. Replacing the frame rendered within the item 501 allows the user to modify previous selections directly instead of having to delete selections and restart frame selection again.

Accordingly, using the items 403 and 501 of the list 408 described above, a user may watch a video displayed within the item 403 whilst approximately selecting frames of the video during desirable moments. Once the user has finished watching the video the user can adjust the selections as described above to choose an optimum frame. The user does not have to first pause and adjust the viewing representation 403 to select the optimum frame, thereby disrupting the enjoyment of watching the video normally.

Figure 7A:
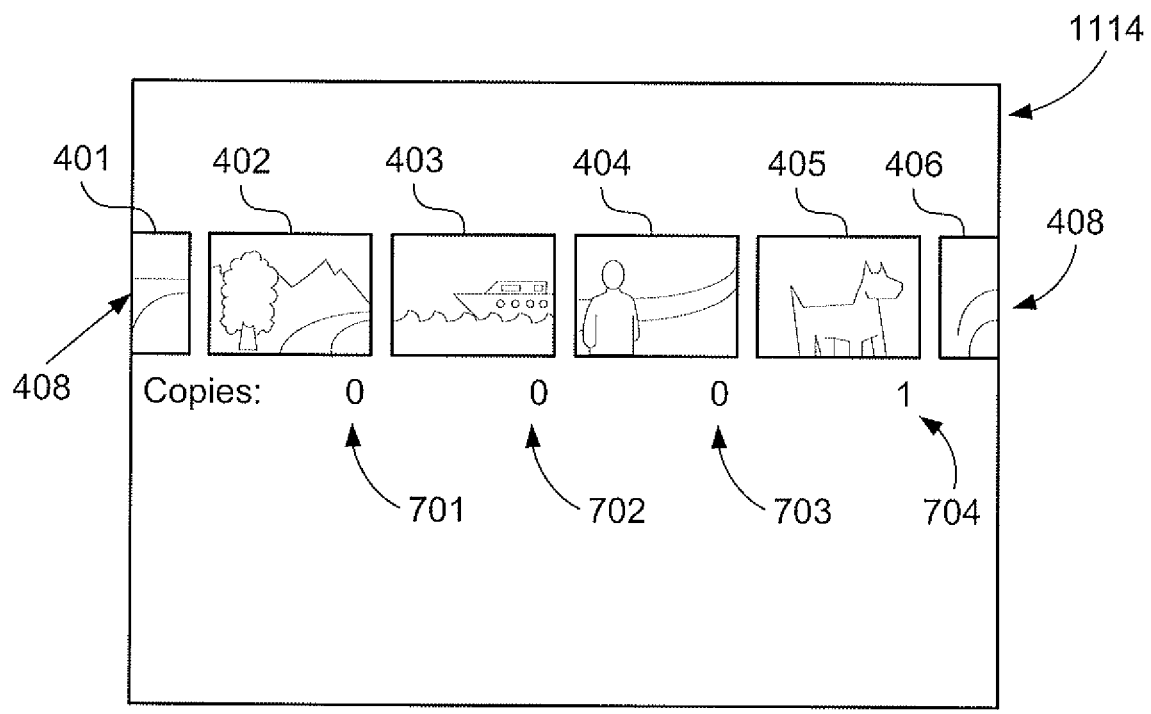
FIG. 7A shows the list of FIG. 4A with numbers representing an amount of copies selected for each item.

FIG. 7A shows the display device 1114 on which the example list 408 of FIG. 4A is rendered. However, in the example of FIG. 7A, a number (e.g., 701) representing an amount of copies selected for each item (e.g., 402) in the displayed list 408 is shown using number indicators. In FIG. 7A, the items 401, 402 and 403 which have not been selected, for example, for printing, are indicated as having zero copies 701, 702 and 703, respectively. However, a photo item 405, which in the present example, has been selected, is indicated as having one copy 704. The numbers (e.g., 701) may be implemented using variables stored within the memory 1106, which are updated each time a copy is selected for the corresponding item (e.g., 402).

Figure 7B:
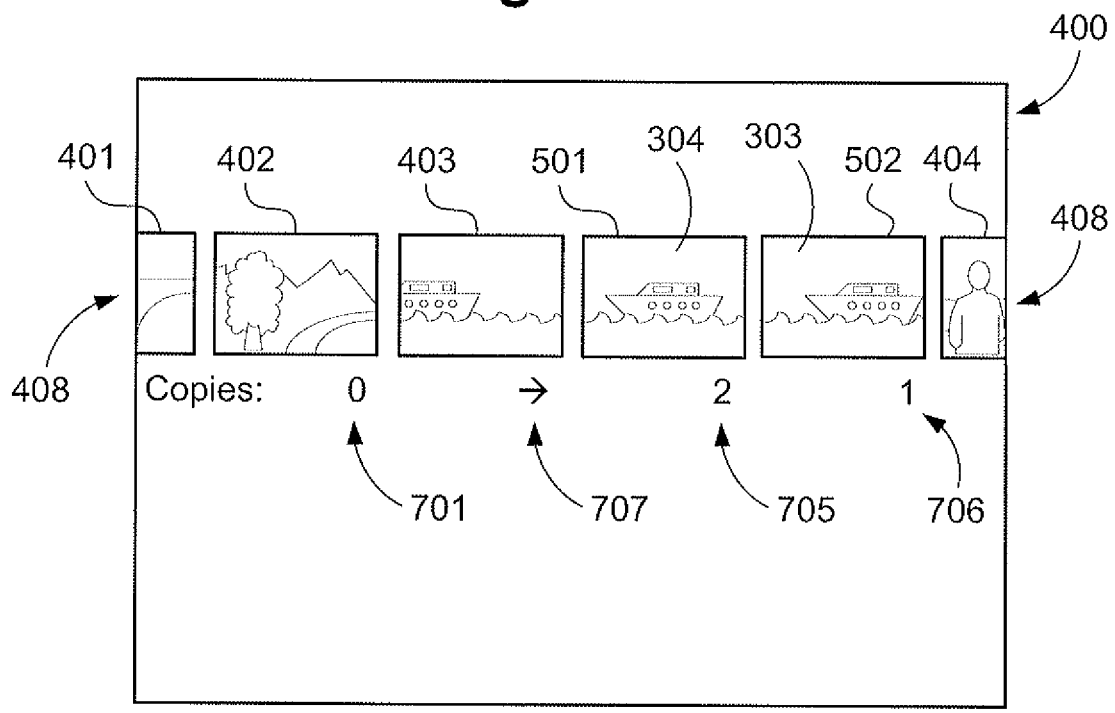
FIG. 7B shows the list of FIG. 7A with one of the numbers being replaced by another indicator.

Continuing the example of FIG. 7A, as shown in FIG. 7B, at a later time, a user has selected, two frames 304 and 303, in the manner described above. In this instance, the numbers 705 and 706 corresponding to the items 501 and 502 displaying the frames 304 and 303, respectively, indicate that the items 501 and 502 have two copies 705 and one copy 706 each. Another indicator 707 is shown under the original item 403 indicating that copies have been selected from the video displayed within the item 403. In an alternative embodiment, the indicator 707 may be replaced with a number indicating how many copies of frames from within the video file comprising the series 300 have been selected in total.

Figure 8:
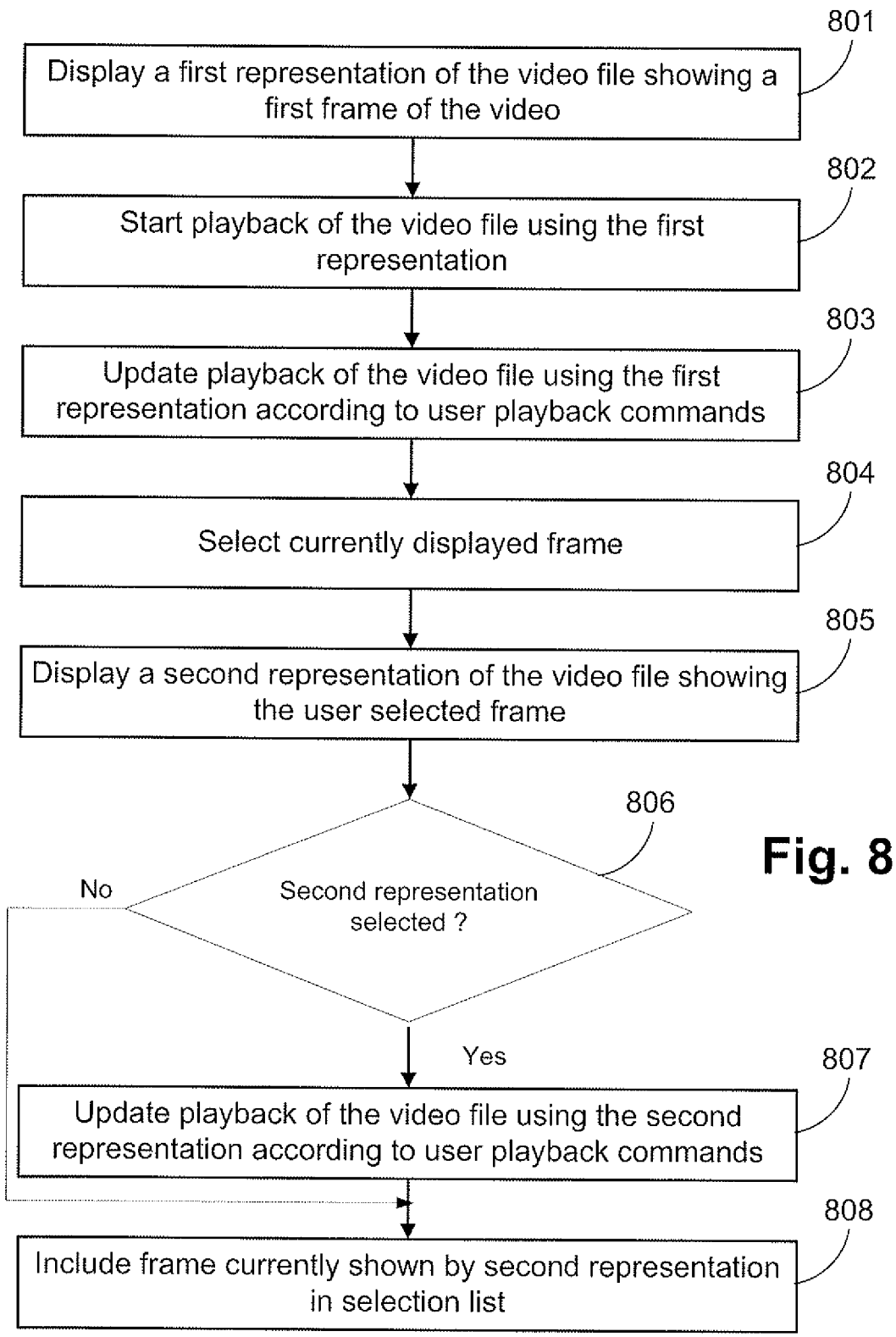
FIG. 8 is a flow diagram showing a method of selecting a video frame from a motion video file.

A method 800 of selecting one or more frames from a motion video file will now be described with reference to FIG. 8. The method 800 may be implemented as software such as the software application 1133 resident on the hard disk drive 1110 and being controlled in its execution by the processor 1105. The method 800 will be described with reference to the examples described above and the example motion video file comprising the series 300 of frames 301 to 306. The motion video file is stored within the data store 100 configured within the hard disk drive 1110.

In step 801, the processor 1105 displays a first representation of the motion video file on the display device 1114. In the present example, the motion video file comprises the series 300 of frames 301-306 and the first representation is the item 403 with the first frame 301 of the series 300 displayed within the item 403. As described above, the first representation, in the form of the item 403, is responsive to one or more playback commands.

In step 802, the processor 1105 starts playing back frames of the motion video file (i.e., the series 300 of frames 301-306) within the first representation (i.e., the item 403) according to normal video playback settings associated with the first representation. Each of the frames 301-306 may be accessed by the processor 1105 from the data store 100.

In step 803, the processor 1105 detects selection of one or more playback controls (e.g., 202) for adjusting (e.g., pausing, fast-forwarding or rewinding) the playback of the video file (i.e., comprising the series 300 of frames 301-306) within the item 403. In response to the selection of the playback controls, the processor 1105 adjusts the playback of the series 300. For example, the processor 1105 may detect selection of the rewind control 209. In response to selection of the control 209, the processor 1105 begins playing back the series 300 in reverse.

In step 804, upon the processor 1105 receiving a command generated upon selection of a control (e.g., 901) by the user, the processor 1105 performs the step of selecting at least one frame of the motion video file. As described above, a frame (e.g., 305) may be selected in response to a command received in relation to the first representation of the motion video file. For example, a user may select the frame 305 being displayed in the item 403 by selecting the print control 901 displayed on the display 114 when the frame 305 is being displayed. Selection of the print control 901 causes the processor 1105 to generate the command.

In step 805, in response to the user's selection of the print control 901, for example, the processor 1105 performs the step of displaying a second representation of the motion video file on the display 1114 in a different area to the first representation. The processor 1105 displays the first frame (e.g., 305) selected from the first representation at step 804 within the second representation. In the present example, the second representation is the item 501.

Then, at the next step 806, if the processor 1105 detects selection of the second representation (i.e., the item 501), the method 800 proceeds to step 807. Otherwise, the method 800 proceeds to directly to step 808. For example, the user may select the second representation using the mouse pointer device 1103, at step 806, so that the second representation (i.e., the item 501) is the focus of one or more playback commands and is responsive to the one or more playback commands.

At the next step 807, the processor 1105 adjusts the frame which the second representation is displaying depending on playback commands selected by the user. A playback command received in relation to the second representation may cause the processor 1105 to replace the display of the selected frame (e.g., 305) with display of a further frame accessed from the data store 100. For example, in response to selection of the control 211, as shown in FIG. 6B, the processor 1105 replaces the frame 305 displayed within the new item 501 with an earlier frame 304 which the user may prefer for selection.

Then, when the user ends the selection phase in step 808, the selected frame displayed in the second representation is included in a selection list configured within the memory 1106. The processor 1105 may perform the step of creating the selection list within memory 1106, including the selected frame, in response to selection of the frame at step 804. The selection list may be used for printing the frames of the selection list. The selection list may also be used for transferring frames within the selection list from one storage device (e.g., 1109) to another storage device. The frames within the selection list may also be displayed during a visual presentation. The processor 1105 may perform the step of displaying only frames included in the selection list in response to a command generated upon selection of, for example, one of the controls 901-905. This further command may be a command to view only the frames in the selection list.

The selection phase may be completed by the user at step 808, for example, by selecting a "Start Printing" command or a "Burn Disc" command or a "Copy to Device" command. In another example, a command executed to end the selection phase may be a command to add the selected frame to the selection list (as described above) for printing. Alternatively, the command executed to end the selection phase may be a command to add the selected frame to a playlist or to the selection list for copying to a new storage location (e.g., from the computer system to a CD-ROM). In another alternative, the command executed to end the selection phase may be a command to add the selected frame to the selection list for creating a new visual presentation comprising a plurality of selected frames.

Figure 10A:
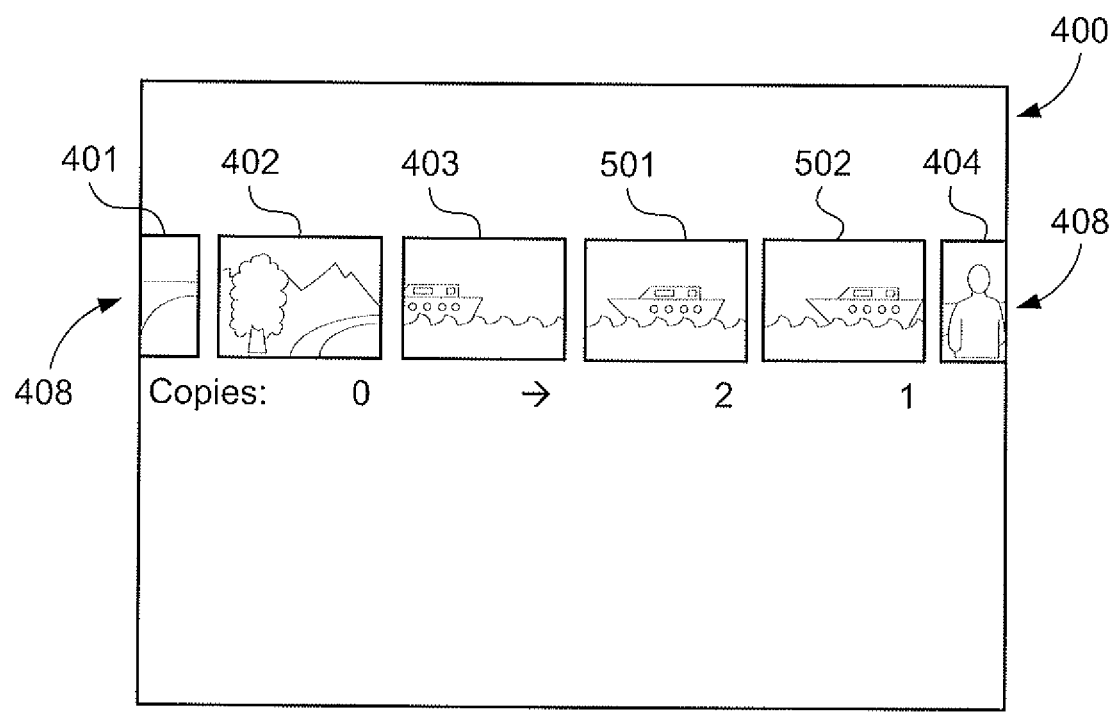
FIG. 10A shows the list of FIG. 7B.
Figure 10B:
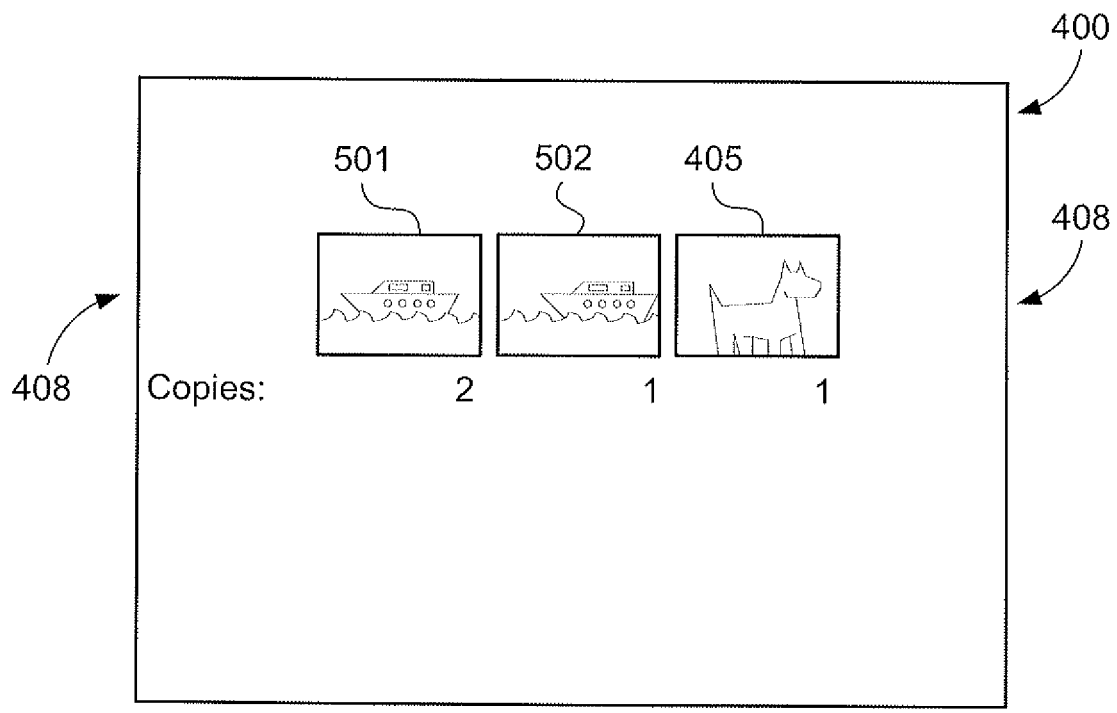
FIG. 10B shows the list of FIG. 10A with only item from which frames have previously been selected, displayed.

In one implementation, the items (e.g., 401, 402, 403, 501) displayed in the list 408 may be filtered so that the list 408 show only the items from which frames have been selected for printing. FIG. 10A shows the list 408 of FIG. 7B rendered on the display device 1114. In one implementation, a user can activate a command to display in the list 408 only the selected items. For example, in FIG. 10B only the items 501, 502, and 405 from which frames have previously been selected by the user are displayed in the list 408. As described above, the numbers 704, 705 and 706 associated with each of the items 501, 502, and 405, respectively, show the amount of copies selected for each of the items 501, 502 and 405.

The methods described above allow a seamless method of operating frame selection in a single application screen layout.

INDUSTRIAL APPLICABILITY

The arrangements described are applicable to the computer and data processing industries and particularly for the selecting frames from a motion video file.

The foregoing describes only some embodiments of the present invention, and modifications and/or changes can be made thereto without departing from the scope and spirit of the invention, the embodiments being illustrative and not restrictive. For example, the described methods may be implemented as software embedded within and being controlled by a processor of a mobile telephone, personal data assistant (PDA), the printer 1115 or the like. The described methods are particularly advantageous for such embedded embodiments. For example, for an embodiment where the software is embedded within a mobile phone, PDA or printer embodiment, the keyboard 1102 may be in the form of a keypad and the display device 1114 may be in the form of a liquid crystal display (LCD). The screen of such a display device may be a touch screen or the like, enabling the user to provide controlling commands and/or input to the applications associated with the GUI(s) using a finger or touch screen stylus. Further, for the mobile phone, PDA or printer embodiment, the hard disk drive 1110 and/or memory 106 may be replaced by flash memory or the like.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method executed by an image processing apparatus, comprising:
    indicating selection of an item from a list of items including the indicated item, the indicated item representing a motion video file;
    playing back frames of the motion video file in the indicated item representing the motion video file, in response to a playback command;
    selecting a current frame displayed in the indicated item, from the frames of the motion video file represented by the indicated item being played back, the current frame being selected in response to receiving a selection command generated upon selection of a control by a user;
    displaying the selected frame in the list as a new item, positions of the other items displayed in the list being adjusted to accommodate the new item, wherein the new item is displayed while the playback of subsequent frames of the motion video file continues in the indicated item so that another frame of subsequent frames can be selected at a later time;
    creating a selection list including the selected frame displayed in the new item;
    indicating selection of the new item in the created selection list; and
    adjusting the frame displayed in the indicated new item from said selected frame to a further frame, in response to receipt of a step command.

2. The method according to claim 1, wherein playback of the new item is stopped when the new item is initially displayed.

3. The method according to claim 1, wherein said created selection list being used for printing selected frames.

4. The method according to claim 1, wherein said created selection list being used for transferring the selected frames to another storage device.

5. The method according to claim 1, wherein said created selection list being used for displaying selected frames during a visual presentation.

6. The method according to claim 1, further comprising receiving a command to add the selected frame to a list for printing.

7. The method according to claim 1, further comprising receiving a command to add the selected frame to a playlist.

8. The method according to claim 1, further comprising receiving a command to add the selected frame to a list for copying to a new storage location.

9. The method according to claim 1, further comprising receiving a command to add the selected frame to the selection list for creating a new visual presentation.

10. The method according to claim 1, further comprising receiving a further command to view only selected frames in the selection list.

11. The method according to claim 1, further comprising displaying frames included in the selection list in response to a further command.

12. An image processing apparatus comprising:
    first indicating means for indicating selection of an item from a list of items including the indicated item, the indicated item representing a motion video file;
    playback means for playing back frames of the motion video file in the indicated item representing the motion video file, in response to a playback command;
    selection means for selecting a current frame displayed in the indicated item from the frames of the motion video file represented by the indicated item being played back, the current frame being selected in response to receiving a selection command generated upon selection of a control by a user;
    displaying means for displaying the selected frame in the list as a new item, positions of the other items displayed in the list being adjusted to accommodate the new item, wherein the new item is displayed while the playback of subsequent frames of the motion video file continues in the indicated item so that another frame of the subsequent frames can be selected at a later time;
    creating means for creating a selection list including the selected frame displayed in the new item;
    second indicating means for indicating selection of the new item in the created selection list; and
    adjusting means for adjusting the frame displayed in the indicated new item from said selected frame to a further frame, in response to receipt of a step command.

13. An image processing system comprising:
    a memory for storing data and a computer program;
    a processor coupled to said memory for executing said program, said program comprising instructions for:
    indicating selection of an item from a list of items including the indicated item, the indicated item representing a motion video file;
    playing back frames of the motion video file in the indicated item representing the motion video file, in response to a playback command;
    selecting a current frame displayed in the indicated item from the frames of the motion video file represented by the indicated item being played back, the current frame being selected in response to receiving a selection command generated upon selection of a control by a user; and
    displaying the selected frame in the list as a new item, positions of the other items displayed in the list being adjusted to accommodate the new item, wherein the new item is displayed while the playback of subsequent frames of the motion video file continues in the indicated item so that another frame of the subsequent frames can be selected at a later time;
    creating a selection list including the selected frame displayed in the new item;
    indicating selection of the new item in the created selection list; and
    adjusting the frame displayed in the indicated new item from said selected frame to a further frame, in response to receipt of a step command.

14. A non-transitory computer readable storage medium having recorded thereon computer-executable code of a computer program, said program comprising:

code for indicating selection of an item from a list of items including the indicated item, the indicated item representing a motion video file;

code for playing back frames of the motion video file in the indicated item representing the motion video file, in response to a playback command;

code for selecting a current frame displayed in the indicated item from the frames of the motion video file represented by the indicated item being played back, the current frame being selected in response to receiving a selection command generated upon selection of a control by a user; and code for displaying the selected frame in the list as a new item, positions of the other items displayed in the list being adjusted to accommodate the new item, wherein the new item is displayed while the playback of subsequent frames of the motion video file continues in the indicated item so that another frame of the subsequent frames can be selected at a later time;

code for creating a selection list including the selected frame displayed in the new item;

code for indicating selection of the new item in the created selection list; and code for adjusting the frame displayed in the indicated new item from said selected frame to a further frame, in response to receipt of a step command.

* * * * *